US012503896B2

(12) United States Patent
Perez

(10) Patent No.: US 12,503,896 B2
(45) Date of Patent: Dec. 23, 2025

(54) HINGES

(71) Applicant: B/E Aerospace B.V., Houten (NL)

(72) Inventor: Jo-Ann Canja Perez, Calamba (PH)

(73) Assignee: B/E AEROSPACE, INC., Winston Salem, NC (US)

( * ) Notice: Subject to any disclaimer, the term of this patent is extended or adjusted under 35 U.S.C. 154(b) by 103 days.

(21) Appl. No.: 18/538,216

(22) Filed: Dec. 13, 2023

(65) Prior Publication Data

US 2024/0191549 A1 Jun. 13, 2024

(30) Foreign Application Priority Data

Dec. 13, 2022 (EP) .................................... 22213271

(51) Int. Cl.

| | |
|---|---|
| ***E05D 3/02*** | (2006.01) |
| ***B64D 11/04*** | (2006.01) |
| ***E05D 5/04*** | (2006.01) |
| ***E05D 11/06*** | (2006.01) |

(52) U.S. Cl.

CPC ................ *E05D 3/02* (2013.01); *B64D 11/04* (2013.01); *E05D 5/046* (2013.01); *E05D 11/06* (2013.01); *E05Y 2201/224* (2013.01); *E05Y 2900/20* (2013.01); *E05Y 2900/502* (2013.01); *E05Y 2900/538* (2013.01)

(58) Field of Classification Search

None

See application file for complete search history.

(56) References Cited

U.S. PATENT DOCUMENTS

| | | | | |
|---|---|---|---|---|
| 1,807,063 | A | 5/1931 | Garrison | |
| 9,187,940 | B2 | 11/2015 | Chandler | |
| 2008/0104797 | A1 | 5/2008 | Chung et al. | |
| 2015/0059126 | A1* | 3/2015 | Dubina | E05D 11/06 16/319 |
| 2017/0050733 | A1 | 2/2017 | Miron et al. | |
| 2017/0350176 | A1* | 12/2017 | Rahman | E05D 5/121 |
| 2019/0003224 | A1* | 1/2019 | Reuter | F25D 23/028 |
| 2019/0093401 | A1* | 3/2019 | Hoenig | F16C 33/203 |
| 2020/0087959 | A1* | 3/2020 | Schabenberger | E05D 3/02 |
| 2020/0292226 | A1* | 9/2020 | Hunter | E05D 5/02 |

(Continued)

FOREIGN PATENT DOCUMENTS

DE 102005047080 B3 11/2006

OTHER PUBLICATIONS

European Search Report for Application No. 22213271.4, mailed May 30, 2023, 8 pages.

*Primary Examiner* — Steven M Marsh

(74) *Attorney, Agent, or Firm* — CANTOR COLBURN LLP

(57) ABSTRACT

A hinge for hingedly mounting a door onto a fixed element. The hinge includes a pivot, and first and second hinge plates. The pivot has a central axis (AP). The first hinge plate comprises a stop element, and the second hinge plate comprises first and second stop surfaces. When the hinge is in a fully closed configuration the first stop surface abuts the stop element. When the hinge is in a fully open configuration the second stop surface abuts the stop element. The first and second hinge plates are so configured that one of the hinge plates may rotate around the central axis (AP) of the pivot relative to the other between the fully closed and fully open configurations.

13 Claims, 4 Drawing Sheets

(56) References Cited

U.S. PATENT DOCUMENTS

| | | | | |
|---|---|---|---|---|
| 2022/0042362 | A1* | 2/2022 | Freedman | E05D 5/12 |
| 2023/0114849 | A1* | 4/2023 | Hunter | F25D 23/028 49/381 |
| 2023/0287718 | A1* | 9/2023 | Prison | E05D 11/02 |
| 2024/0318481 | A1* | 9/2024 | Liu | E05D 5/16 |
| 2025/0101782 | A1* | 3/2025 | Lopez | E05D 11/1014 |

* cited by examiner

HINGES

CROSS REFERENCE TO RELATED APPLICATIONS

This application claims priority to European Patent Application No. 22213271.4 filed Dec. 13, 2022, the entire contents of which is incorporated herein by reference.

TECHNICAL FIELD

This disclosure relates to hinges and, in particular, to hinges for use with doors, storage units that include such hinges, galleys that include such storage units, and aircraft that include such hinges.

Storage units on aircraft have doors. These doors are attached to units so that they can move with hinges relative to the units.

SUMMARY

According to a first aspect there is provided a hinge for hingedly mounting a door onto a fixed element in which the hinge comprises a pivot, and first and second hinge plates. The pivot has a central axis. The first hinge plate comprises a stop element, and the second hinge plate comprises first and second stop surfaces. When the hinge is in a fully closed configuration the first stop surface abuts the stop element, and when the hinge is in a fully open configuration the second stop surface abuts the stop element. The first and second hinge plates are so configured that one of the hinge plates may rotate around the central axis of the pivot relative to the other between the fully closed and fully open configurations.

The fully closed configuration for the hinge is one in which the door to which the hinge is, in use, attached is so positioned that it fully closes the mouth or aperture that the door is intended to close. For example, for a cupboard door where the cupboard has only one mouth or opening through which the inside of the cupboard can be accessed, the door is in the fully closed position when the door completely blocks access to the inside of the cupboard.

The fully open configuration for the hinge is the configuration where the second stop surface abuts the stop element.

An advantage of the hinge of the present disclosure is that the configuration and relative positioning of the stop element and the stop surfaces allows a high degree of control of the angle of rotation between the fully closed and fully open configurations. Further, the stop element and stop surfaces have the effect that the hinge can prevent the door being over opened or over closed. This can result in preventing the opened door from impacting on other doors, walls or other objects that could otherwise fall within the volume swept by the door when rotating about the pivot if the stop element and stop surfaces were not present.

In an embodiment of the above embodiment, one of the first and second hinge plates may rotate 180 degrees around the central axis of the pivot relative to the other of the first and second hinge plates between the fully closed and fully open configurations.

In other embodiments of the above embodiment, the hinge may be so configured that one of the first and second hinge plates may rotate a predetermined angle around the central axis of the pivot relative to the other of the first and second hinge plates between the fully closed and fully open configurations. For example, but without limitation, the angle may be 90 degrees.

In an embodiment of any of the above embodiments, each hinge plate comprises a pivot element, an offset portion, and an arm portion.

In an embodiment of any of the above embodiments, each arm portion is longitudinally extending, each arm portion has a longitudinal axis, and each longitudinal axis extends in a direction that is approximately perpendicular to the central axis of the pivot.

In an embodiment of any of the above embodiments, the arm portion has a rectangular cross-section in a plane perpendicular to the longitudinal axis, and the longitudinal axis passes through the geometric centre of a cross section of the arm portion.

In an embodiment of any of the above embodiments, each longitudinal axis is so orientated that that longitudinal axis does not pass through the pivot.

In an embodiment of any of the above embodiments, each longitudinal axis extends in a linear direction.

In an embodiment of any of the above embodiments, each offset portion is configured to connect the arm portion to the pivot element, and the offset portion has a longitudinal axis that intersects the longitudinal axis of the arm portion to which it is connected at an angle which is greater than zero degrees.

In an embodiment of any of the above embodiments, the pivot comprises the pivot elements of the first and second hinge plates, and the pivot elements of the first and second hinge plates are so configured that they engage with each other and allow relative rotation of one hinge plate relative to the other.

In an embodiment of any of the above embodiments, the pivot elements of the first and second hinge plates engage with each other via a pivot pin.

In some embodiments of the above embodiment the pivot pin is integral with one of the pivot elements of the first and second hinge plates.

In some embodiments of the above embodiment the pivot pin is separate from either of the parts of the pivot element of the first and second hinge plates.

In an embodiment of any of the above embodiments, the first hinge plate is configured to be fixed to the fixed element and the second hinge plate is configured to be fixed to the door. The fixed element may be, without limitation, a doorframe or a frame of a structure such as a storage unit frame, a wall, or a bulkhead in a ship or an aircraft.

According to a second aspect of the present disclosure there is provided a storage unit for use in a galley, in which the storage unit comprises a unit frame which defines a cupboard space, a cupboard door configured to close a mouth into the cupboard space, and two hinges according to the first aspect, in which the cupboard door is hingedly attached to the unit frame by the hinges.

In an embodiment of the above embodiment, the hinges are so configured that one of the first and second hinge plates may rotate 180 degrees around the central axis of the pivot relative to the other of the first and second hinge plates between the fully closed and fully open configurations, and the cupboard door may move between a fully closed configuration in which the cupboard door is positioned in the mouth into the cupboard space, and a fully open configuration in which the cupboard door is positioned in a plane parallel to and perpendicularly spaced from the plane of the cupboard door when in the fully closed position. Alternatively expressed, the planes in which the cupboard door sits when in the fully open and fully closed configuration are parallel or substantively parallel.

According to a fourth aspect of the present disclosure there is provided a galley comprising at least one storage unit according to the second aspect of the present disclosure.

According to a second aspect of the present disclosure there is provided an aircraft comprising at least one storage unit according to the second aspect of the present disclosure The apparatus of the first and second aspects of the present disclosure can include one or more, or all, of the features described above, as appropriate.

BRIEF DESCRIPTION OF THE FIGURES

The present invention will be further described and explained by way of example with reference to the accompanying drawings in which.

DETAILED DESCRIPTION

Figure 1:
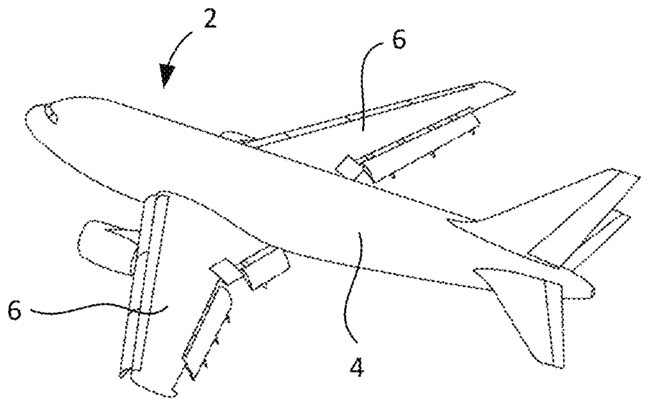
FIG. 1 shows an aircraft.

With reference to FIG. 1, an aircraft 2 has a body 4 and a pair of wings 6. Within the body 4 is a galley (not shown) within which food and beverages may be prepared. The food and beverages are for the occupants of the aircraft 2 when the aircraft is in flight, before a flight, or after a flight.

Figure 2:
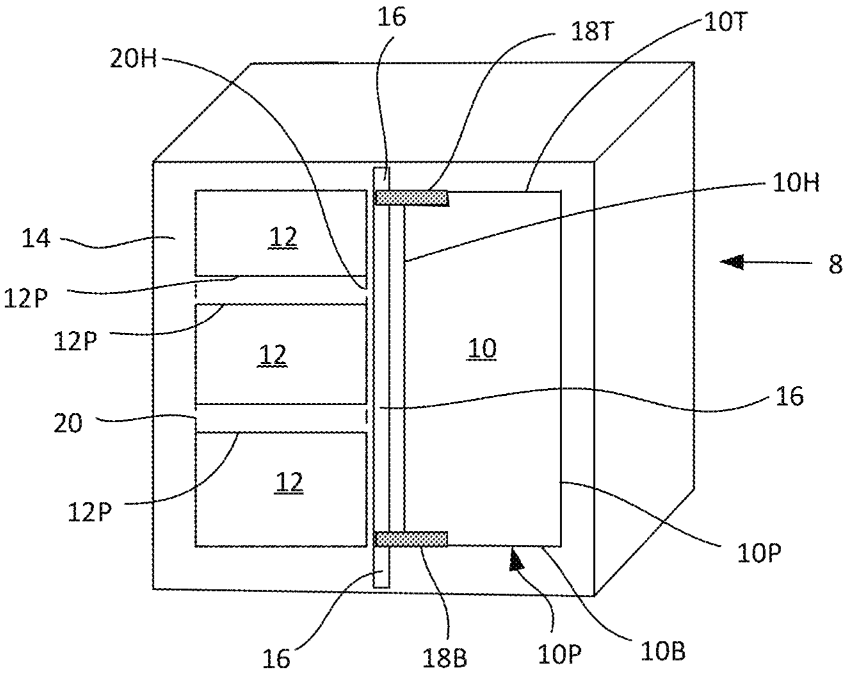
FIG. 2 shows a first schematic view of an storage unit incorporating an embodiment of a hinge according to the present disclosure.
Figure 3:
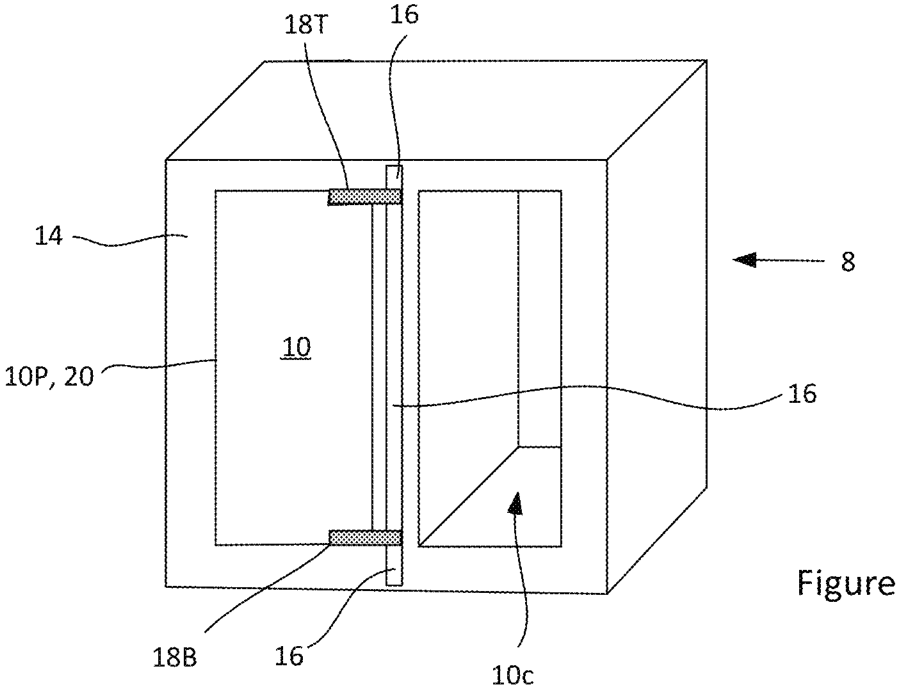
FIG. 3 shows a second schematic view of an storage unit incorporating an embodiment of a hinge according to the present disclosure.

With reference to FIGS. 2 and 3, the galley includes at least one storage unit 8 which includes a unit frame 14, a cupboard 10C which has a cupboard door 10 and at least one draw which has a draw front 12.

The cupboard door 10 is hingedly connected to the unit frame 14 by a pair of hinges 18T, 18B. The cupboard door has a vertically uppermost edge 10T, a vertically lowermost edge 10B, and a hinge edge 10H that extends between the ends of edges 10T, 10B that are closest to the draw fronts 12. The hinges 18T and 18B are attached to the cupboard door 10 in recesses 70 (see FIG. 6) located at the ends of edges 10T and 10B that intersect with the hinge edge.

References to verticality are based on the storage unit being orientated for use when the aircraft 2 in which the storage unit 8 is located when the aircraft is on the ground.

The unit frame 14 defines the mouth of the cupboard 10C, cupboard door 10, and a non-zero number of apertures in which draw fronts 12 are located. The cupboard door 10 closes the mouth of the cupboard 10C by filling the mouth.

Supported on the unit frame 14 between the cupboard door 10 and the draw fronts 12 is a vertically extending light unit 16. The light unit 16 both provides illumination in the area of the storage unit 8, and assists the identification of the location of the cupboard 10C/cupboard door 10 and draw fronts 12 in low light conditions such as at night. In other non-illustrated embodiments the light unit 16 is integral with or set into the unit frame 14.

The illustrated storage unit 8 has three draws/draw fronts 12. Each draw front 12 has an outer perimeter 12P. The outer perimeters 12P are so dimensioned and located that they all fall within a draw perimeter 20. The draw perimeter 20 is the shortest perimeter that surrounds all of the draw fronts 12, and is dimensionally substantially the same as the outer perimeter 10P of the cupboard door 10. The draw perimeter 20 is so located that when the cupboard door 10 is in its fully open configuration (shown in FIG. 3 and described more fully below) the cupboard door 10 overlies the draw perimeter 20.

In some non-illustrated storage units 8 the units have other non-zero numbers of draws/draw fronts 12 and fall within the scope of the present disclosure. In other non-illustrated storage units 8 the units have include a second cupboard 10C in place of the draws/draw fronts 12 and again such storage units fall within the scope of the present disclosure. In both such embodiments the outer perimeters 12P/10P of the draws/second cupboard respectively are dimensionally substantially the same.

Figure 6:
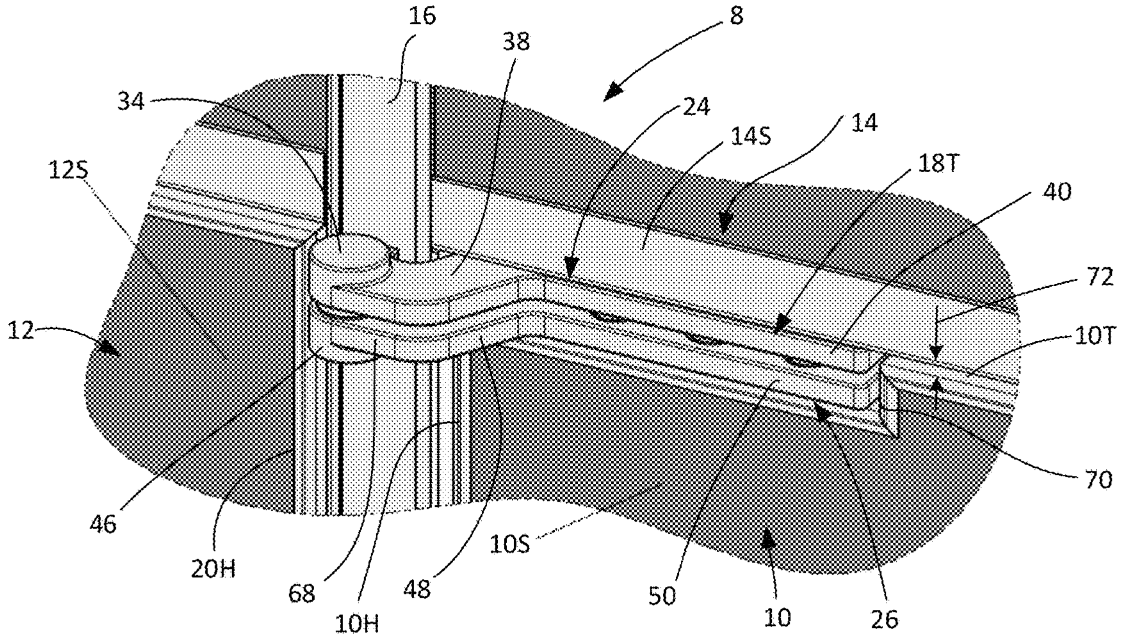
FIG. 6 shows an enlarged detail of FIG. 2.

With reference to FIGS. 2 and 6, the cupboard door 10 has a fully closed configuration in which the cupboard door 10 closes the mouth of the cupboard 10C, and the outer surface 10S of the cupboard door 10 is flush with (or in the same plane as) the outer surface 14S of the unit frame 14 and the outer surfaces 12S of the draw fronts 12 (when each of the draws are in a fully closed configuration). The draws are in a fully closed configuration when they are fully within the storage unit 8 and the outer surface 12S of the draw is flush with (or in the same plane as) the outer surface 14S of the unit frame 14.

For the avoidance of doubt, the outer surface of an element of the storage unit 8 is the surface that faces away from the storage unit 8.

Figure 7:
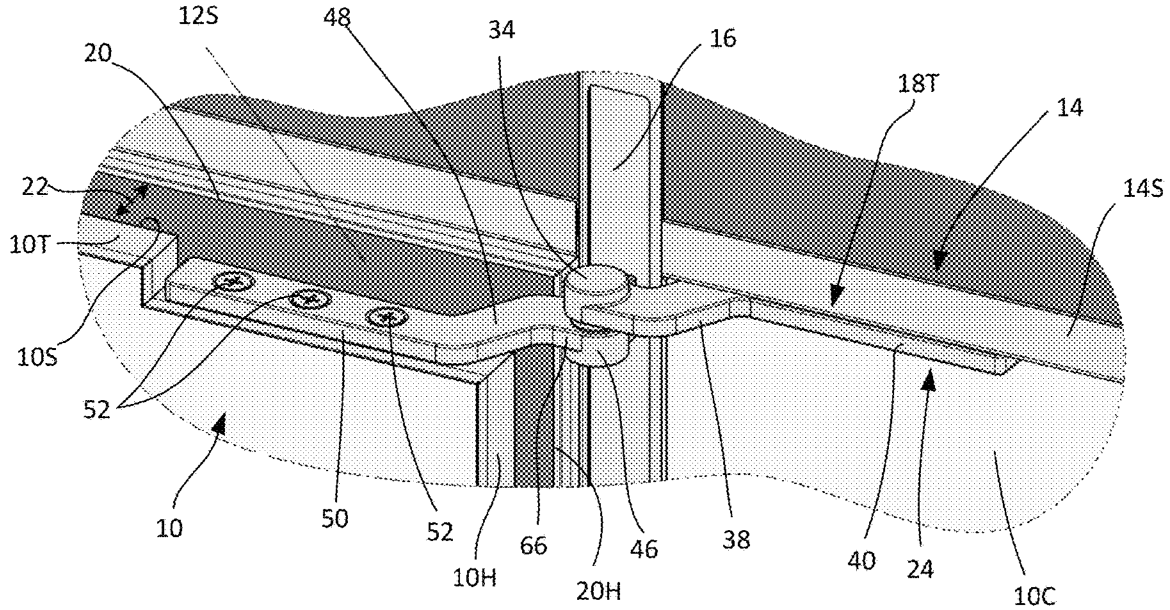
FIG. 7 shows an enlarged detail of FIG. 3.

With reference to FIGS. 3 and 7, the cupboard door 10 has a fully open configuration in which the cupboard door 10 is completely clear of the mouth of the cupboard 10C, the outer surface 10S of the cupboard door 10 is parallel to the outer surface of the outer surfaces 12S of the draw fronts 12, and the substantial majority of the perimeter 10P is spaced from the draw perimeter 20 by a distance 22 in a direction perpendicular to the plane which includes the outer surfaces 12S and 14S when the draws are in their fully closed configuration.

Figure 4:
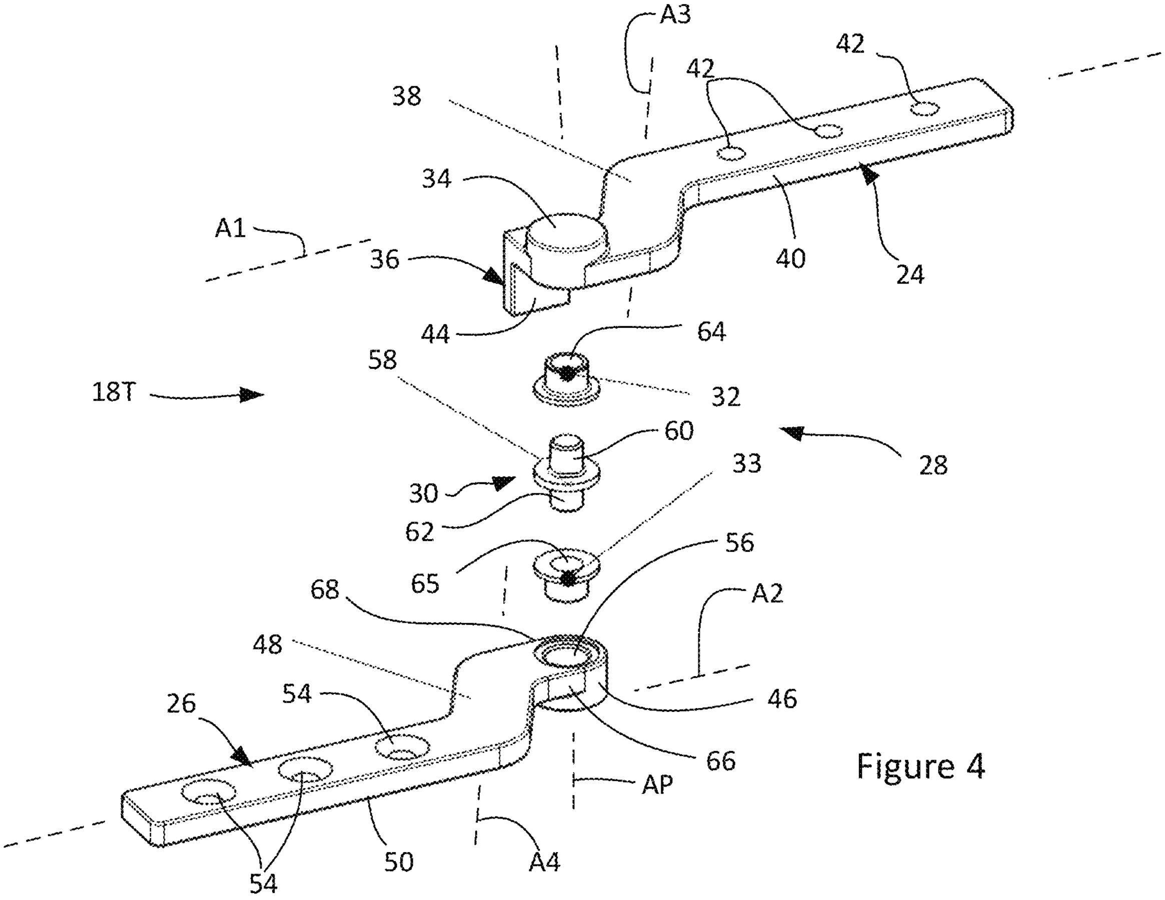
FIG. 4 shows a schematic exploded view of a first embodiment of a hinge according to the present disclosure.
Figure 5:
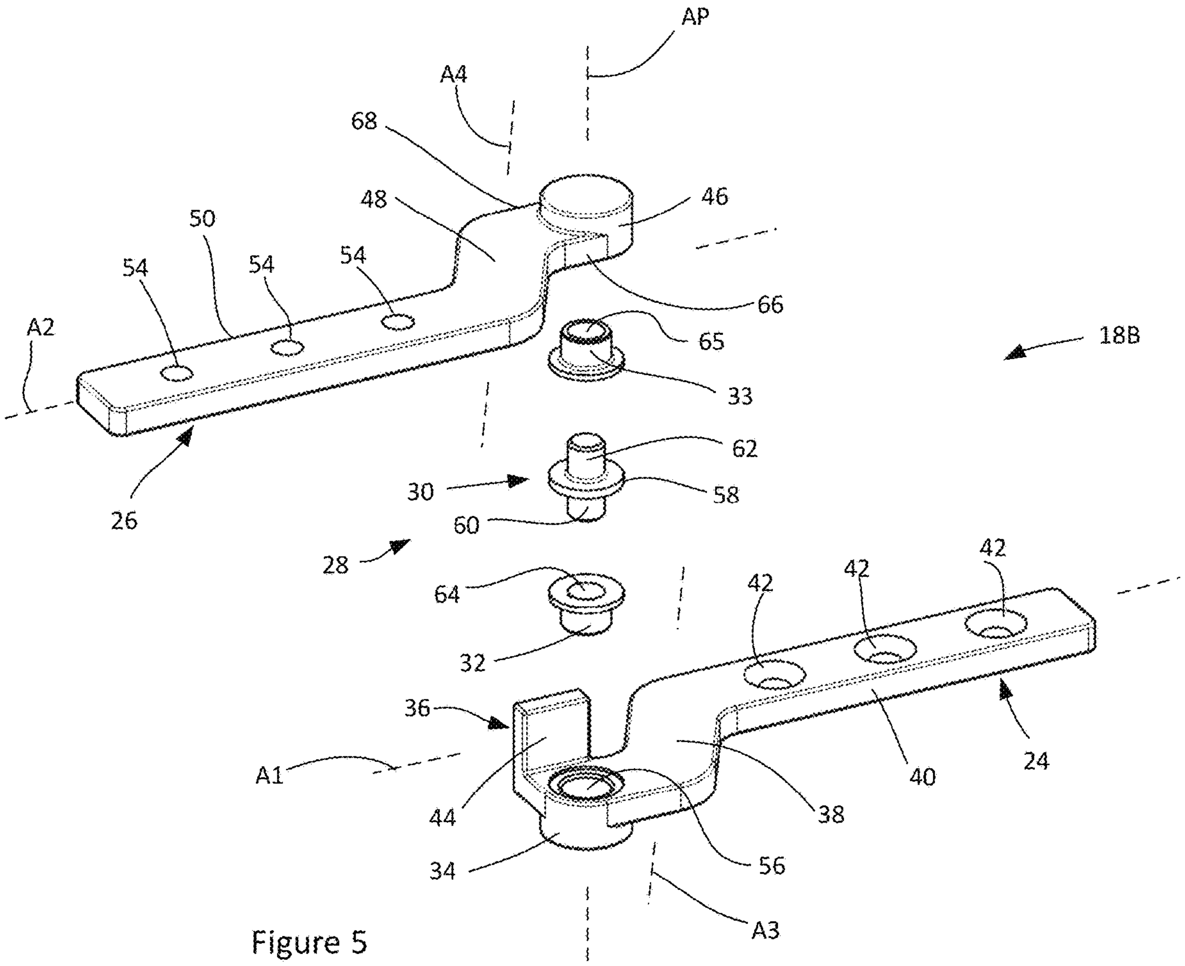
FIG. 5 shows a schematic exploded view of a second embodiment of a hinge according to the present disclosure.

With reference to FIGS. 4 and 5, each of the hinges 18T, 18B are so configured that they may be fixed to both the cupboard door 10 and the unit frame 14, and the hinge can rotate through an angle of 180 degrees allowing the door to move between its fully closed and its fully open configurations. The hinges 18T and 18B are, when fixed to the unit 14 for use, configured as reflections of each other around an a horizontal axis.

Hinge 18T includes a first hinge plate 24 (also known as a hinge leaf), a second hinge plate 26, and a pivot 28. The pivot 28 allows the hinge plates 24, 26 to rotate relative to each other, and forces may be transmitted between the first and second hinge plates 24, 26 through the pivot 28.

The pivot 28 includes a first and second bush 32, 33, a hinge pin 30, and a first and second hinge elements in the form of first and second pivot cups 34, 46. The pivot 28 has a central axis AP about which the hinge plates 24, 26 rotate.

The hinge pin 30 is comprised of substantially cylindrical first and second parts 60, 62 separated by a flange 58. The first and second parts 60, 62 are coaxial with each other and axis AP, and of approximately the same length and diameter. The diameter of the first and second parts 60, 62 is suitable to be received in sliding contact within bores 64, 65 of first and second bushes 32, 33 in the first and second pivot cups 34, 46. The flange 58 prevents the first and second bushes 32, 33 in the first and second pivot cups 34, 46 contacting each other.

The first hinge plate 24 includes the first pivot cup 34, a stop element 36 extending from the first pivot cup 34, an offset portion 38 extending from the first pivot cup 34, and an arm portion 40 extending from the offset portion 38.

The arm portion 40 is longitudinally extending with a longitudinal axis A1. The arm portion 40 is configured to be attached to the unit frame 14 by screws (not shown) extending through bores 42. The arm portion 40 is also so configured that the central axis A1 extends past but does not intersect the central axis AP of the pivot 28. The longitudinal axis A1 is perpendicular to the direction of the central axis AP.

Extending between the first pivot cup 34 and the end of the arm portion 40 closest to the first pivot cup 34 is the offset portion 38. The offset portion 38 is integral with both the first pivot cup 34 and arm portion 40. The offset portion 38 has a longitudinal axis A3 which intersects with the longitudinal axis A1 at an acute angle of approximately 60 degrees.

The first pivot cup 34 forms part of the pivot 28 and defines a hollow portion (not shown). The hollow portion is configured to receive and retain the first bush 32. The first bush 32 is retained in the hollow portion by friction. The first bush 32 is configured to include a bore 64 which is adapted to receive the first portion 60 of the hinge pin 30 in a sliding engagement.

The second hinge plate 26 includes a second pivot cup 46, an offset portion 48 extending from the pivot cup 46, and an arm portion 50 extending from the offset portion 48.

The arm portion 50 is longitudinally extending with a longitudinal axis A2. The arm portion 50 is configured to be attached to the cupboard door 10 by screws 52 extending through bores 54. The arm portion 50 is also so configured that the longitudinal axis A2 extends past but does not intersect the central axis AP of the pivot 28.

Extending between the second pivot cup 46 and the end of the arm portion 50 closest to the second pivot cup 46 is the offset portion 48. The offset portion 48 is integral with both the second pivot cup 46 and arm portion 50. The offset portion 48 has a longitudinal axis A4 which intersects with the longitudinal axis A2 at an acute angle of approximately 60 degrees.

The second pivot cup 46 forms part of the pivot 28 and defines a hollow portion 56. The hollow portion 56 is configured to receive and retain the second bush 33. The second bush 33 is retained in the hollow portion 56 by friction. The second bush 33 is configured to include a bore 65 which is adapted to receive the second portion 62 of the hinge pin 30 in a sliding engagement.

The first and second hinge plates 24, 26 are the same as each other (with the exception of the stop element 36) in terms of dimension and configuration. This has the effect that when the cupboard door 10 is in the fully closed configuration, and thus the hinge 18T is in the fully closed configuration, that the first and second hinge plates 24, 26 are adjacent to each other with the arm portion 40 and offset portion 38 of the first hinge plate 24, and the arm portion 50 and offset portion 48 of the second hinge plate 26 extending in a parallel fashion and fully overlying each other. The longitudinal axes A1 and A2 of the arm portions 40, 50 are parallel to each other when the hinge 18T is in the fully closed configuration.

The stop element 36 includes a first stop face 44. The stop element 36 is so configured that when the hinge 18T is in the fully closed configuration a first stop surface 66 on the second hinge plate 26 abuts the first stop face 44. This prevents the second hinge plate 26 rotating in an anticlockwise direction around the hinge pin 30 relative to the first hinge plate 24 from that fully closed configuration.

Anticlockwise and clockwise are, for the purposes of this description to be considered in terms of the hinge as shown and orientated in FIG. 4.

The stop element 36 is also so configured that when the cupboard door 10, and thus the hinge 18T, is in the fully open configuration (shown in FIG. 4) a second stop surface 68 on the second hinge plate 26 abuts the first stop face 44. This prevents the second hinge plate 26 rotating in a clockwise direction around the hinge pin 30 relative to the first hinge plate 24 from that fully open configuration.

In the embodiment of the hinge 18T shown in FIG. 4 the first stop face 44 and the first and second stop surfaces 66, 68 are all at least approximately flat. In other embodiments one or more of the first stop face 44 and the first and second stop surfaces 66, 68 may have different configurations.

The cupboard door 10 is configured to include a recess 70 in the part of the cupboard door edge 10T adjacent to the hinge edge 10H and the second hinge plate 26 of the hinge 18T is attached to the cupboard door 10 in that recess. The recess 70 is sufficiently long and deep that when the second hinge plate 26 is fixed to the cupboard door 10 by the screws 52 the face of the first hinge plate 24 that will abut the unit frame 8 is a desired distance proud of the plane in which the cupboard door edge 10T sits. That desired distance is the distance 72 that the cupboard door 10 is to be spaced from the unit frame 14 when the cupboard door is in the fully closed configuration.

The offset portions 38, 48 are so configured that when the first and second hinge plates 24, 26 are fixed to the unit frame 14/cupboard door 10 respectively, the axis AP of the pivot 28 is spaced from the plane in which outer surfaces 10S of the cupboard door 10 and 12S of the draw fronts 12 by half the distance 22. Further, the axis AP of the pivot 28 is, in the direction between the hinge edge 10H of the cupboard door 10 and the part 20H of the draw perimeter 20, halfway between the hinge edge 10H of the cupboard door 10 and the part 20H of the draw perimeter 20.

It will be understood that the above description of the hinge 18T set out above applies equally to the hinge 18B as shown in FIG. 5.

The above description is meant to be exemplary only, and one skilled in the art will recognize that changes may be made to the embodiments described without departing from the scope of the disclosure. Still other modifications which fall within the scope of the present disclosure will be apparent to those skilled in the art, in light of a review of this disclosure.

Various aspects of the hinges and storage units disclosed in the various embodiments may be used alone, in combination, or in a variety of arrangements not specifically discussed in the embodiments described above. This disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A storage unit for use in a galley comprising:

a unit frame which defines a cupboard space;

a cupboard door configured to close a mouth into the cupboard space; and two hinges, wherein each of the two hinges includes:

a pivot having a central axis (AP);

a first hinge plate that includes a stop element;

a second hinge plate that includes first and second stop surfaces;

wherein:

when the hinge is in a fully closed configuration the first stop surface abuts the stop element;

when the hinge is in a fully open configuration the second stop surface abuts the stop element; and the first and second hinge plates are configured that one of the hinge plates may rotate around the central axis (AP) of the pivot relative to the other between the fully closed and fully open configurations; and wherein the cupboard door is hingedly attached to the unit frame by the two hinges.

2. A storage unit according to claim 1, wherein one of the first and second hinge plates may rotate 180 degrees around the central axis (AP) of the pivot relative to the other of the first and second hinge plates between the fully closed and fully open configurations.

3. A storage unit according to claim 1, wherein each hinge plate comprises a pivot element, an offset portion, and an arm portion.

4. A storage unit according to claim 3, wherein each arm portion is longitudinally extending, each arm portion has a longitudinal axis (A1, A2), and each longitudinal axis (A1, A2) extends in a direction that is approximately perpendicular to the central axis (AP) of the pivot.

5. A storage unit according to claim 4, wherein each longitudinal axis (A1, A2) is so orientated that that longitudinal axis (A1, A2) does not pass through the pivot.

6. A storage unit according to claim 4, wherein each longitudinal axis (A1, A2) extends in a linear direction.

7. A storage unit according to claim 4, wherein each offset portion is configured to connect the arm portion to the pivot element, and the offset portion has a longitudinal axis (A3, A4) that intersects the longitudinal axis (A1, A2) of the arm portion to which it is connected at an angle which is greater than zero degrees.

8. A storage unit according to claim 3, wherein the pivot comprises the pivot elements of the first and second hinge plates, and the pivot elements of the first and second hinge plates are so configured that they engage with each other and allow relative rotation of one hinge plate relative to the other.

9. A storage unit according to claim 8, wherein the pivot elements of the first and second hinge plates engage with each other via a pivot pin.

10. A storage unit according to claim 1, wherein the first hinge plate is configured to be fixed to the fixed element and the second hinge plate is configured to be fixed to the door.

11. A storage unit according to claim 1, wherein:

one of the first and second hinge plates may rotate 180 degrees around the central axis (AP) of the pivot relative to the other of the first and second hinge plates between the fully closed and fully open configurations;

each hinge plate comprises a pivot element, an offset portion, and an arm portion; and the hinges are so configured that the cupboard door may move between a fully closed configuration in which the cupboard door is positioned in the mouth into the cupboard space, and a fully open configuration in which the cupboard door is positioned in a plane parallel to and perpendicularly spaced from the plane of the cupboard door when in the fully closed position.

12. A galley comprising:

at least one storage unit according to claim 1.

13. An aircraft comprising:

at least one storage unit according to claim 1.

* * * * *